(12) United States Patent
Chuang

(10) Patent No.: US 9,046,113 B2
(45) Date of Patent: Jun. 2, 2015

(54) VENTURI TUBE ASSEMBLY AND MANUAL/PNEUMATIC PUMP INCLUDING THE VENTURI TUBE ASSEMBLY

(75) Inventor: Chia-Chiung Chuang, Taichung (TW)

(73) Assignee: JEN SIAN INDUSTRIAL CO., LTD., Taichung (TW)

( * ) Notice: Subject to any disclaimer, the term of this patent is extended or adjusted under 35 U.S.C. 154(b) by 838 days.

(21) Appl. No.: 13/291,465

(22) Filed: Nov. 8, 2011

(65) Prior Publication Data

US 2012/0134852 A1 May 31, 2012

(30) Foreign Application Priority Data

Nov. 26, 2010 (TW) ................................ 99141036 A

(51) Int. Cl.
- F04F 5/14 (2006.01)
- F04B 33/00 (2006.01)
- F16K 5/02 (2006.01)
- F16K 1/14 (2006.01)
- F04F 5/52 (2006.01)

(52) U.S. Cl.
CPC . *F04F 5/14* (2013.01); *F04B 33/00* (2013.01); *F16K 5/0221* (2013.01); *F16K 1/14* (2013.01); *F04F 5/52* (2013.01)

(58) Field of Classification Search
CPC .............. F04B 33/00; F04B 9/14; F04F 5/14; F04F 5/20; F04F 5/52; F04F 3/00; F04F 1/02; F04F 1/06; F16K 1/14; F16K 5/0221
USPC ...................... 417/187, 374, 118, 86; 137/205
See application file for complete search history.

(56) References Cited

U.S. PATENT DOCUMENTS

| | | | | |
|---|---|---|---|---|
| 1,986,476 A | * | 1/1935 | Ironside | 141/28 |
| 2,682,886 A | * | 7/1954 | Paxton | 137/205 |
| 5,427,505 A | * | 6/1995 | Payne | 417/149 |
| 6,537,036 B1 | * | 3/2003 | Broerman et al. | 417/182.5 |
| 6,558,138 B2 | * | 5/2003 | Tseng | 417/374 |
| 6,722,855 B2 | * | 4/2004 | Tien-Tsai | 417/199.1 |
| 6,755,207 B1 | * | 6/2004 | Curtis et al. | 137/205 |
| 7,093,624 B2 | * | 8/2006 | Chen | 141/65 |
| 7,367,366 B2 | * | 5/2008 | Liao | 141/26 |
| 8,360,741 B2 | * | 1/2013 | Chuang | 417/185 |

* cited by examiner

*Primary Examiner* — Devon Kramer
*Assistant Examiner* — Nathan Zollinger
(74) *Attorney, Agent, or Firm* — Guice Patents PLLC

(57) ABSTRACT

A Venturi tube assembly includes: a Venturi tube having a body section with an inlet end, an outlet end and an internal flow passage between the inlet end and the outlet end, a pneumatic sucking passage outward extending from a low static pressure section of the internal flow passage to an outer circumference of the body section; and a blocking member having an exhaustion space for communicating the outlet end with the atmosphere, a blocking body movable between an unblocking position and a blocking position and a microsection movable between a full open position and a microposition. When positioned in the full open position, the exhaustion space fully communicates the outlet end with the atmosphere, whereby full amount of airflow is exhausted from the outlet end to the atmosphere. When positioned in the micro-position, only a micro-amount of airflow is exhausted from the outlet end to the atmosphere.

14 Claims, 10 Drawing Sheets

VENTURI TUBE ASSEMBLY AND MANUAL/PNEUMATIC PUMP INCLUDING THE VENTURI TUBE ASSEMBLY

BACKGROUND OF THE INVENTION

1. Field of the Invention

The present invention relates generally to a fluid control technique, and more particularly to a Venturi tube assembly and a manual/pneumatic pump including the Venturi tube assembly.

2. Description of the Related Art

In the field of vehicle service technique, a Venturi tube is often applied to a service tool as a component thereof for lowering air pressure in a closed space. FIG. 1 shows a conventional Venturi tube assembly 90 having an inlet end 901 and an internal flow passage 902 with different diameters of sections. After high-pressure gas enters the inlet end 901 of the Venturi tube assembly 90, the high-pressure gas flows through the different diameters of sections of the internal flow passage 902 at different speeds to create different pressure environments in different positions. Accordingly, the gas in an external closed space 91 in communication with a low static pressure section 903 of the flow passage 902 can be sucked into the flow passage 902 to gradually lower the pressure in the space 91.

In a vehicle service site, an air compressor is often practically used as a high-pressure gas source for the Venturi tube assembly 90 to suck out fuel of a vehicle.

Please further refer to FIG. 2. In the conventional technique, the Venturi tube assembly 92 can be used in another mode for increasing pressure in a closed space. A movable blocking member 922 is disposed at the outlet end 921 of the Venturi tube assembly 92. When the blocking member 922 is positioned in a blocking position to block the outlet end 921, the high-pressure gas entering the Venturi tube assembly 92 will reversely flow from the low static pressure section 923 into the closed space 93 to increase air pressure in the closed space 93. Under such circumstance, the fuel originally contained in the space 93 will be driven to flow out of the space 93 so as to vacate the space 93 for next fuel sucking operation.

According to the above arrangement, the direction in which the gas flows within the Venturi tube assembly can be changed to achieve both sucking and exhaustion effects. However, in the exhaustion operation, a mass of high-pressure gas will very quickly flows from the Venturi tube assembly into the closed space. In case the strength of the container defining the closed space is insufficient, the container may explode to put the operator in danger.

SUMMARY OF THE INVENTION

It is therefore a primary object of the present invention to provide a Venturi tube assembly including a micro-section movable between a full open position and a micro-position. When the Venturi tube assembly is used in a mode for increasing pressure in a closed space, the micro-section is positioned in a micro-position to keep the internal flow passage of the Venturi tube assembly in communication with the atmosphere at micro-amount, whereby the high-pressure gas entering the internal flow passage can partially escape to the atmosphere to slow down the speed at which the pressure in the closed space is increased.

It is a further object of the present invention to provide a manual/pneumatic pump including the above Venturi tube assembly.

To achieve the above and other objects, the Venturi tube assembly of the present invention includes: a Venturi tube having a body section, an inlet end being positioned on one side of the body section, while an outlet end being positioned on the other side of the body section, an internal flow passage being formed in the body section between the inlet end and the outlet end, a pneumatic sucking passage outward extending from a low static pressure section of the internal flow passage to an outer circumference of the body section; and a blocking member having an exhaustion space for communicating the outlet end with the atmosphere and a blocking body movable between an unblocking position and a blocking position. When positioned in the unblocking position, the outlet end communicates with the atmosphere via the exhaustion space. When positioned in the blocking position, the outlet end is blocked out of communication with the atmosphere. The Venturi tube assembly is characterized in that the blocking member further includes a micro-section movable between a full open position and a micro-position. When positioned in the full open position, the exhaustion space fully communicates the outlet end with the atmosphere, whereby full amount of airflow is exhausted from the outlet end to the atmosphere. When positioned in the micro-position, a micro-amount of airflow smaller than the full amount is exhausted from the outlet end to the atmosphere.

The present invention can be best understood through the following description and accompanying drawings, wherein:

DETAILED DESCRIPTION OF THE PREFERRED EMBODIMENTS

Figure 1:
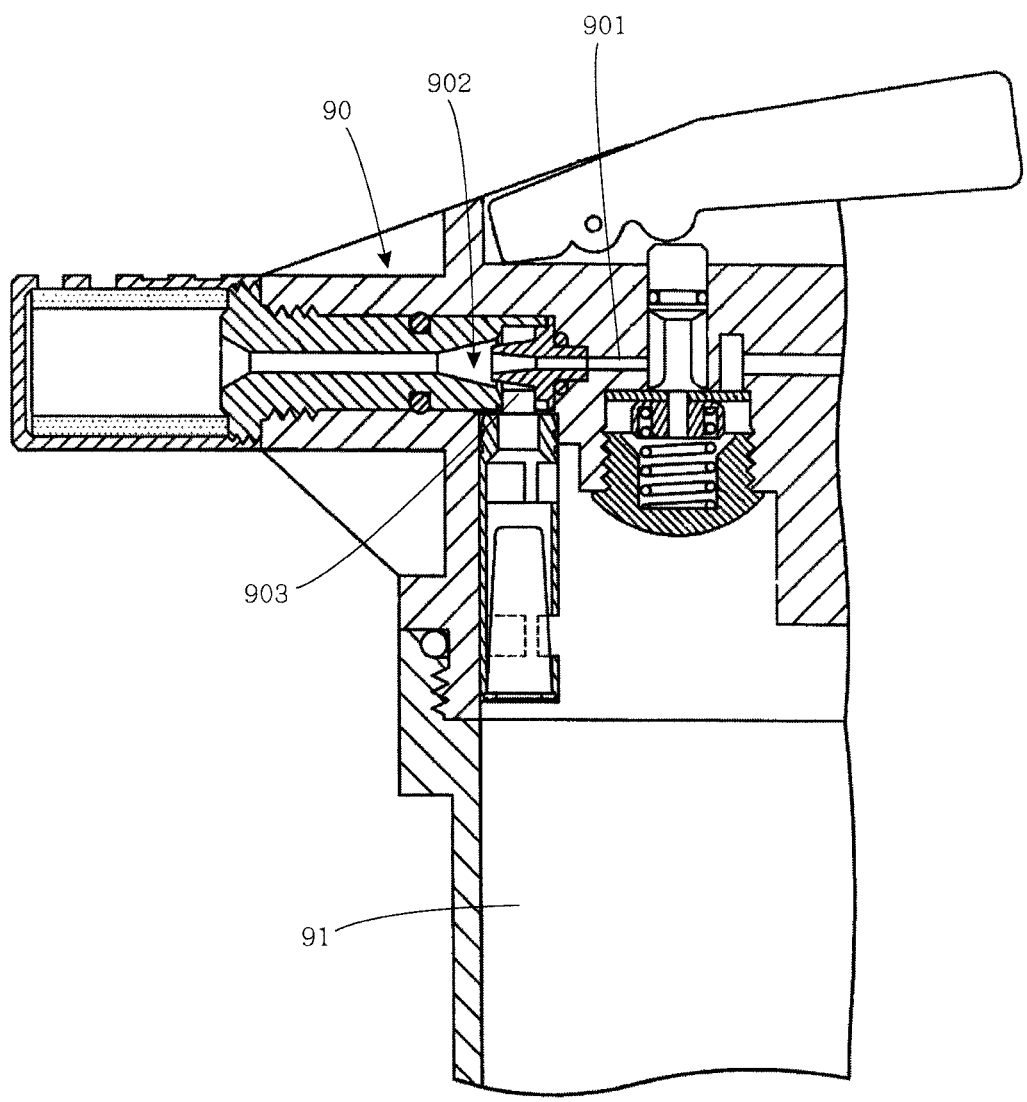
FIG. 1 is a sectional view of a conventional fluid pumping device.
Figure 2:
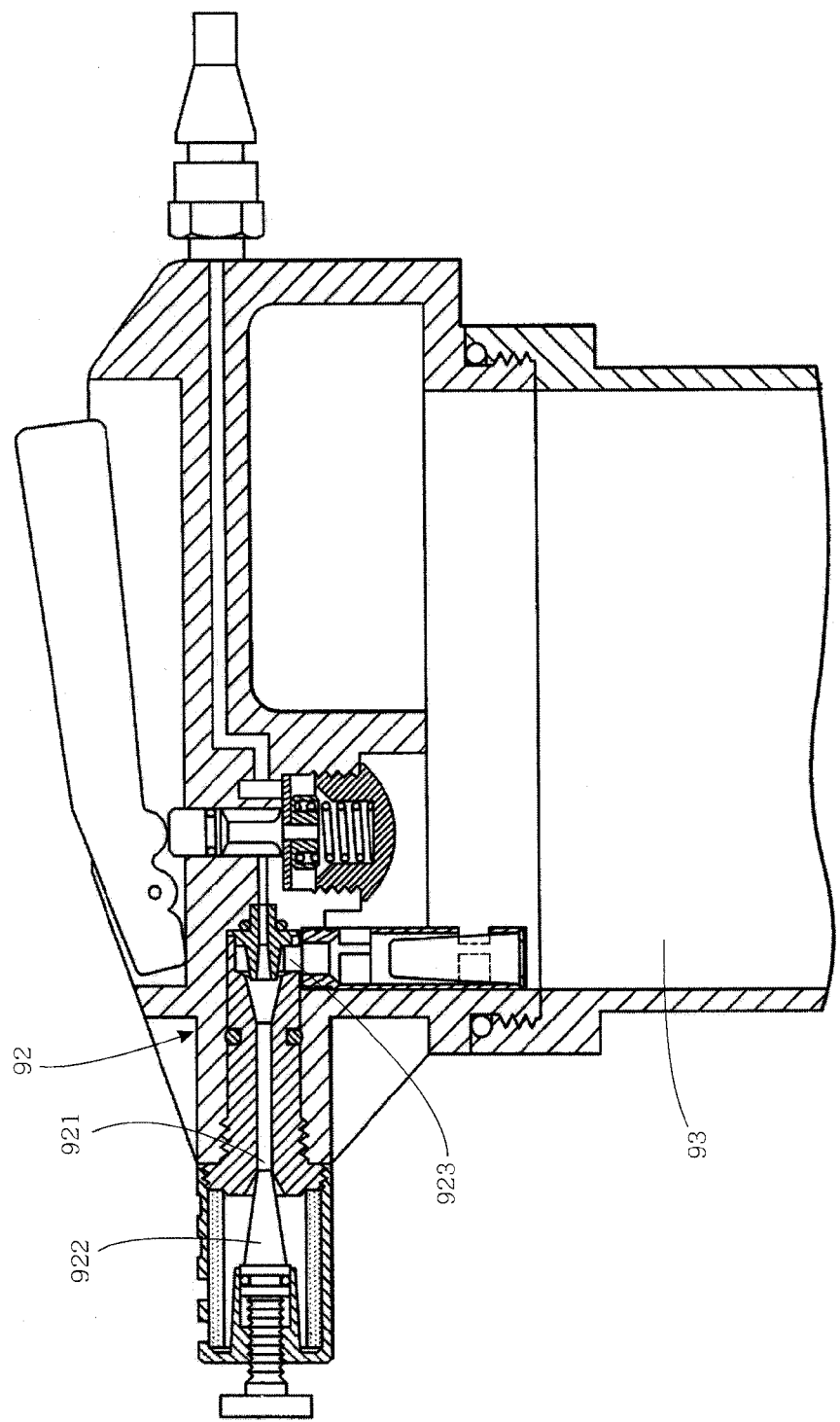
FIG. 2 is a sectional view of a conventional fluid pumping/exhaustion device.
Figure 3:
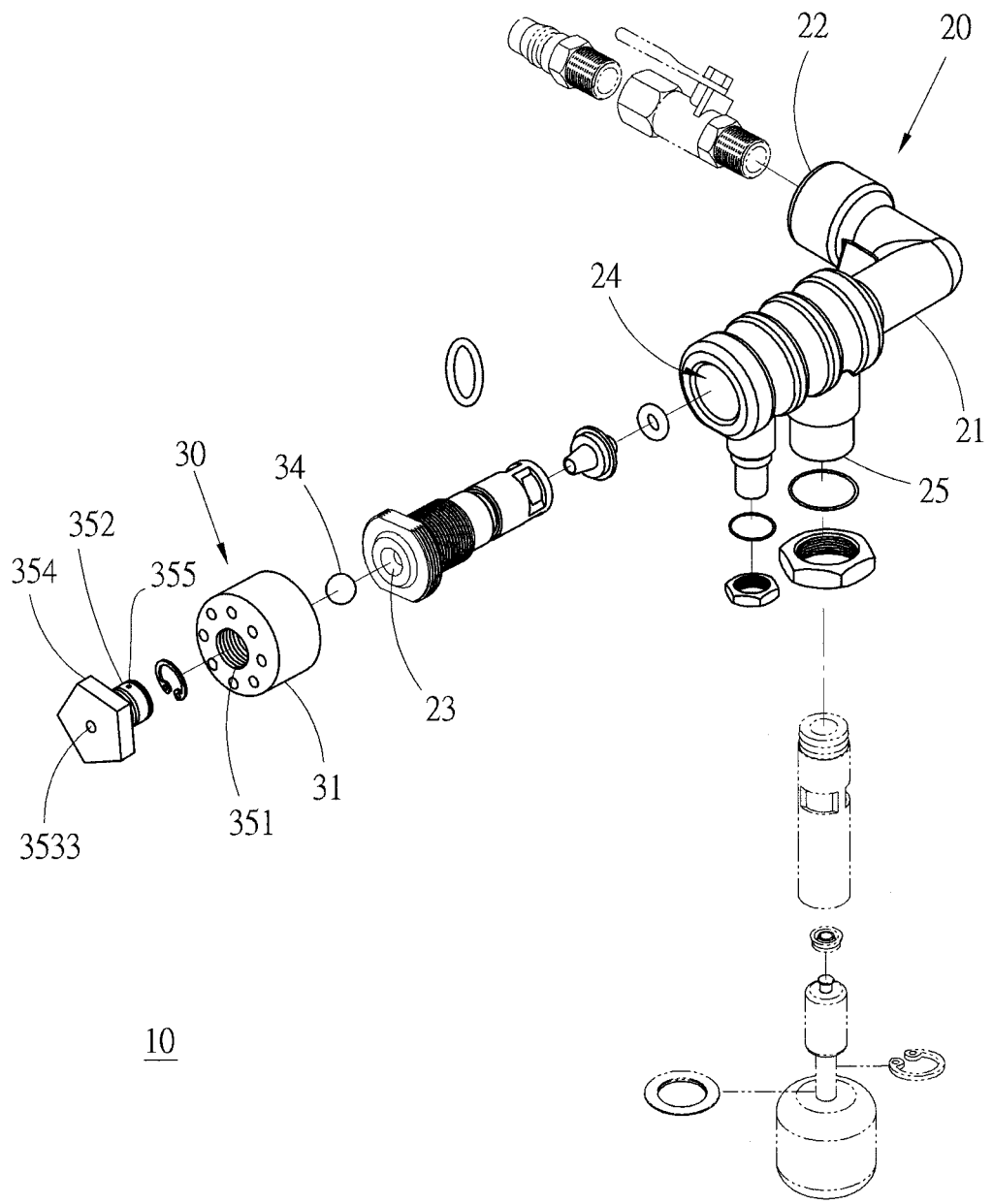
FIG. 3 is a perspective exploded view of a preferred embodiment of the Venturi tube assembly of the present invention.
Figure 4:
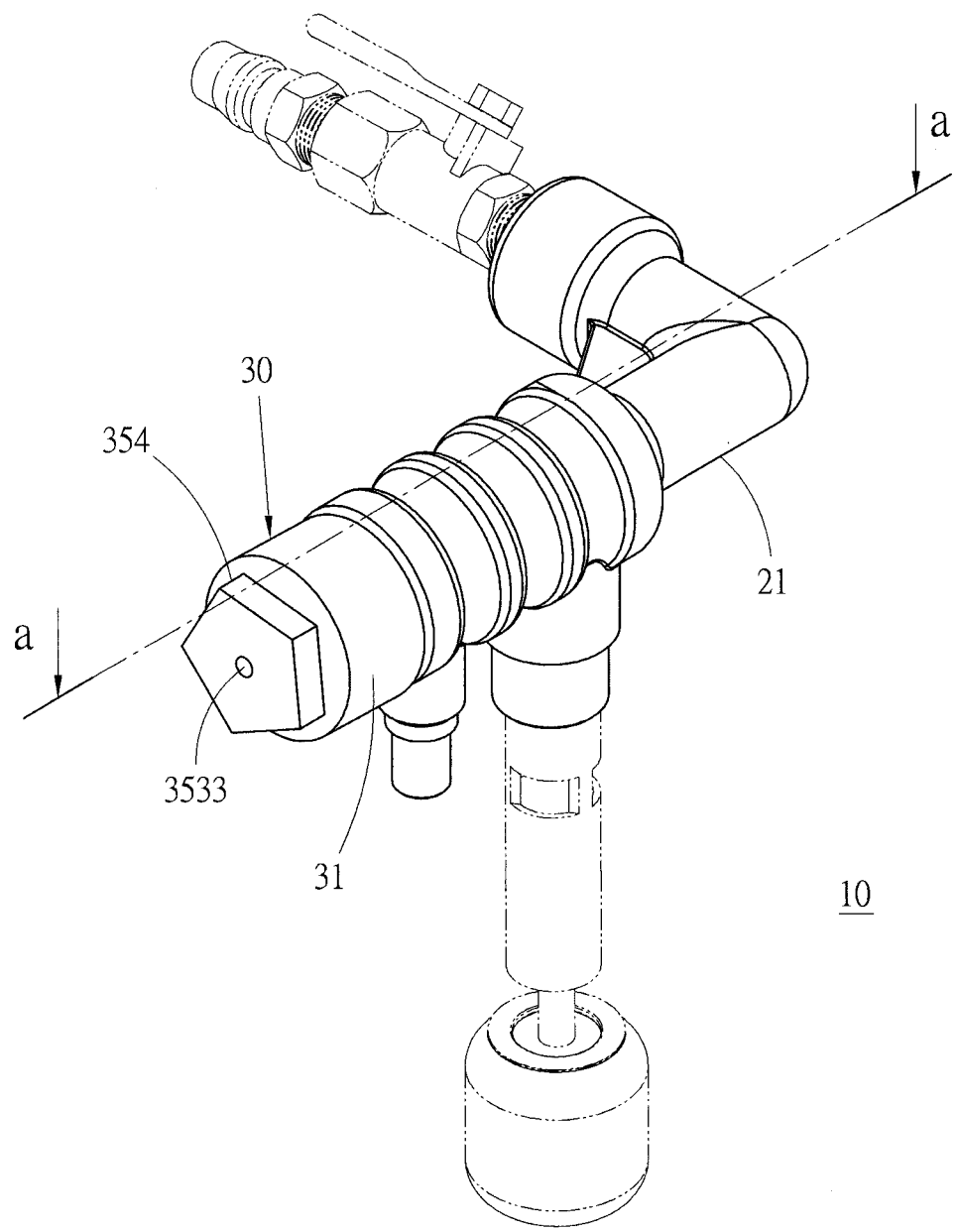
FIG. 4 is a perspective assembled view of the preferred embodiment of the Venturi tube assembly of the present invention.
Figure 5:
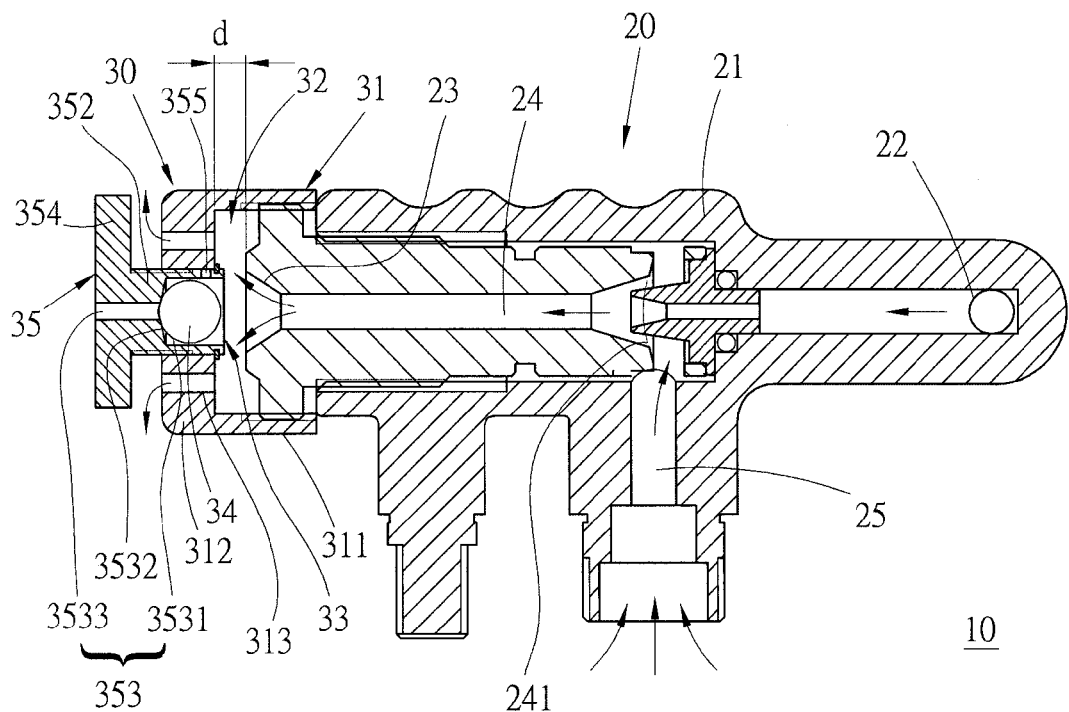
FIG. 5 is a sectional view taken along line a-a of FIG. 4, showing that the micro-section is positioned in a full open position.
Figure 6:
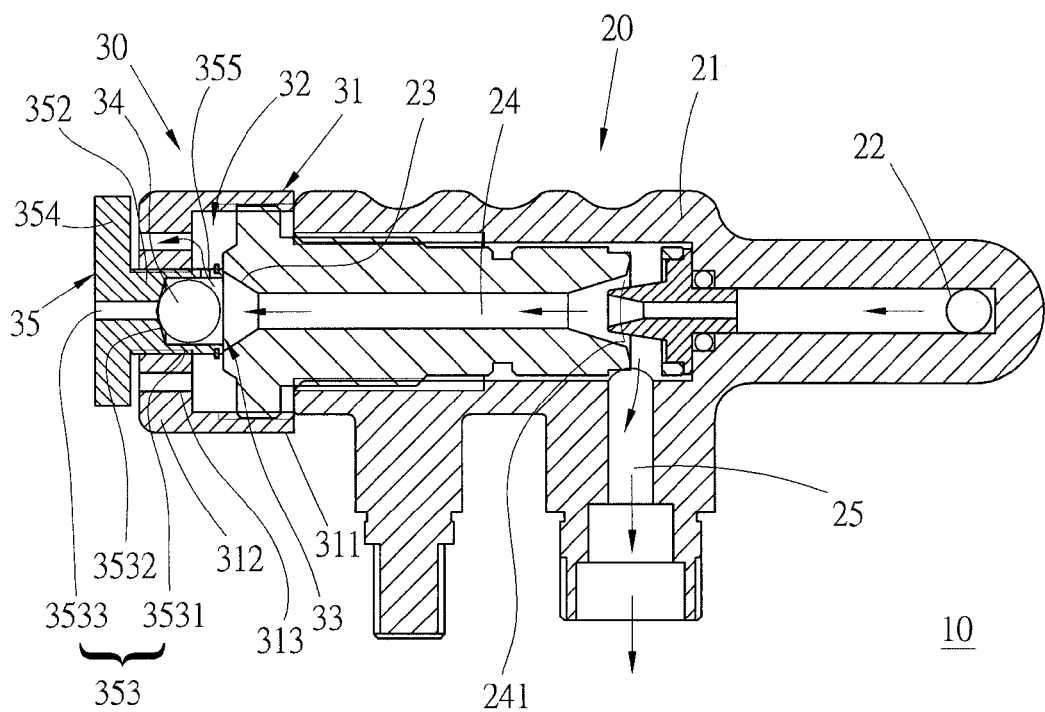
FIG. 6 is a sectional view taken along line a-a of FIG. 4, showing that the micro-section is positioned in a micro-position.

Please refer to FIGS. 3 to 6. According to a preferred embodiment, the Venturi tube assembly 10 includes a Venturi tube 20 and a blocking member 30.

The Venturi tube 20 pertains to prior art. Structurally, the Venturi tube 20 has a body section 21 with a certain configuration. An inlet end 22 is positioned on one side of the body section 21, while an outlet end 23 is positioned on the other side of the body section 21. An internal flow passage 24 with different diameters of sections is formed in the body section 21 between the inlet end 22 and the outlet end 23. When a fluid flows from the inlet end 22 through the internal flow passage 24 to the outlet end 23, the fluid flows at different speeds in different diameters of sections of the internal flow passage 24 to create different static pressures. A pneumatic sucking passage 25 outward extends from a low static pressure section 241 of the internal flow passage 24 to form an opening on outer circumference of the body section 21.

The blocking member 30 has an end section 31 fixedly connected to outer circumference of the outlet end 23. An exhaustion space 32 is defined between the end section 31 and the outlet end 23. A movement space 33 is defined between the outlet end 23 and the end section 31 in communication with the exhaustion space 32. A ball-shaped blocking body 34 is received in the movement space 33 and movable between an unblocking position and a blocking position. When positioned in the unblocking position, the outlet end 23 communicates with the exhaustion space 32. When positioned in the blocking position, the outlet end 23 is blocked out of communication with the exhaustion space 32. A micro-section 35 is disposed on the end section 31 and movable between a full open position and a micro-position. When positioned in the full open position, the exhaustion space fully communicates the outlet end 23 with the atmosphere, whereby full amount of airflow is exhausted from the outlet end 23 to the atmosphere. When positioned in the micro-position, a micro-amount of airflow smaller than the full amount is exhausted from the outlet end 23 to the atmosphere.

To speak more specifically, the end section 31 has a connection collar 311. One end of the connection collar 311 is screwed on the outlet end 23. An end board 312 is connected with the other end of the connection collar 311 to block the other end of the connection collar 311. The end board 312 is spaced from the outlet end 23 by a gap d smaller than the diameter of the blocking body 24 for blocking the interior space of the connection collar 311 to form the exhaustion space 32. Multiple exhaustion ports 313 are formed through the end board 312 and annularly arranged on the end board 312 for communicating the exhaustion space 32 with the atmosphere.

The micro-section 35 fits into a thread hole 351 formed through the end board 312 and coaxial with the outlet end 23. A shaft body 352 in the form of a threaded rod is screwed in the threaded hole 351 with one end extending into the interior of the connection collar 311 and directed to the outlet end 23. A cavity 353 inward axially extends from an end face of one end of the shaft body 352 through the shaft body 352 to an end face of the other end of the shaft body 352. In the extending direction, the cavity 353 is sequentially divided into a large-diameter section 3531, an annular shoulder face 3532 and a small-diameter section 3533. The diameter of the blocking body 34 is between the diameter of the large-diameter section 3531 and the diameter of the small-diameter section 3533. A space between the large-diameter section 3531 and the outlet end 23 serves as the movement space 33. The blocking body 34 is movable within the movement space 33. A drive end 354 is disposed at the other end of the shaft body 352 for a user to forcedly rotate the shaft body 352, whereby the shaft body 352 can be axially moved between the full open position and the micro-position. When the shaft body 352 is positioned in the micro-position, the end face of one end of the shaft body 352 abuts against a circumference of the outlet end 23 to block the outlet end 23 from the exhaustion space 32 with the cavity 353 in communication with the outlet end 23. When the shaft body 352 is positioned in the full open position, the end face of the end of the shaft body 352 is spaced from an end face of the outlet end 23, whereby the outlet end 23 communicates with the exhaustion space 32. A micro-hole 355 is formed through a circumferential wall of the large-diameter section 3531 of the cavity 353 in communication with the cavity 353. Accordingly, when the shaft body 353 is positioned in the micro-position, the cavity 353 communicates with the exhaustion space 32 via the micro-hole 355. In this case, a micro-amount of airflow is permitted to flow from the outlet end 23 to the exhaustion space 32 through the micro-hole 355.

According to the above arrangement, the Venturi tube assembly 10 can be used in at least two modes for an operator to perform corresponding operation as follows:

1. The Venturi tube assembly 10 can be used to lower air pressure of a specific closed space. This mode is identical to that of the conventional technique. In this mode, the shaft body 352 is positioned in the full open position. Accordingly, the external high-pressure gas entering the inlet end 22 can freely flow through the internal flow passage 24, the outlet end 23, the exhaustion space 32 and the exhaustion ports 313 to the atmosphere at full amount. Therefore, the gas in the closed space in communication with the pneumatic sucking passage 25 can be sucked out to lower the pressure in the closed space.

2. The Venturi tube assembly 10 can be used to increase air pressure of a specific closed space at partial amount. The conventional technique fails to provide such mode. To speak more specifically, in this mode, the shaft body 352 is positioned in the micro-position. Under such circumstance, the gas entering the inlet end 22 can partially flow through the internal flow passage 24 to the outlet end 23 and escape via the micro-hole 355 to the atmosphere at micro-amount, while other part of the gas will reversely flow through the pneumatic sucking passage 25 into the closed space in communication with the pneumatic sucking passage 25 to increase the pressure in the closed space.

It should be noted that in a not operated state, the blocking body 34 is positioned on the bottom of the movement space 33 due to gravity. In other words, in a not operated state, the blocking body 34 is normally open and kept in the unblocking position under gravity. When high-pressure gas ejected from the outlet end 33, the blocking body 34 is further blown to move away from the outlet end 33 to still unblock the outlet end 33. Moreover, when the blocking body 34 is pushed by the airflow from one side, the gas on the opposite side will escape through the small-diameter section 3533 to the atmosphere. Accordingly, the blocking body 34 will be smoothly forcedly moved by the airflow to stably abut against the shoulder face 3532 without randomly bounding within the movement space 33 due to turbulence.

In this embodiment, there is no structure for actively moving and locating the blocking body 34 in the blocking position. This is because in this embodiment, the Venturi tube assembly 10 is applied to a manual/pneumatic pump 40. Therefore, it is unnecessary to provide any structure for actively moving the blocking body 34 to the blocking position. This is achievable by means of a manual pumping member of the manual/pneumatic pump 40. Such technique has been particularly disclosed in the applicant's Taiwanese Patent Application No. 099217624 and is not included in the scope of the present invention and thus will not be further described hereinafter.

Figure 7:
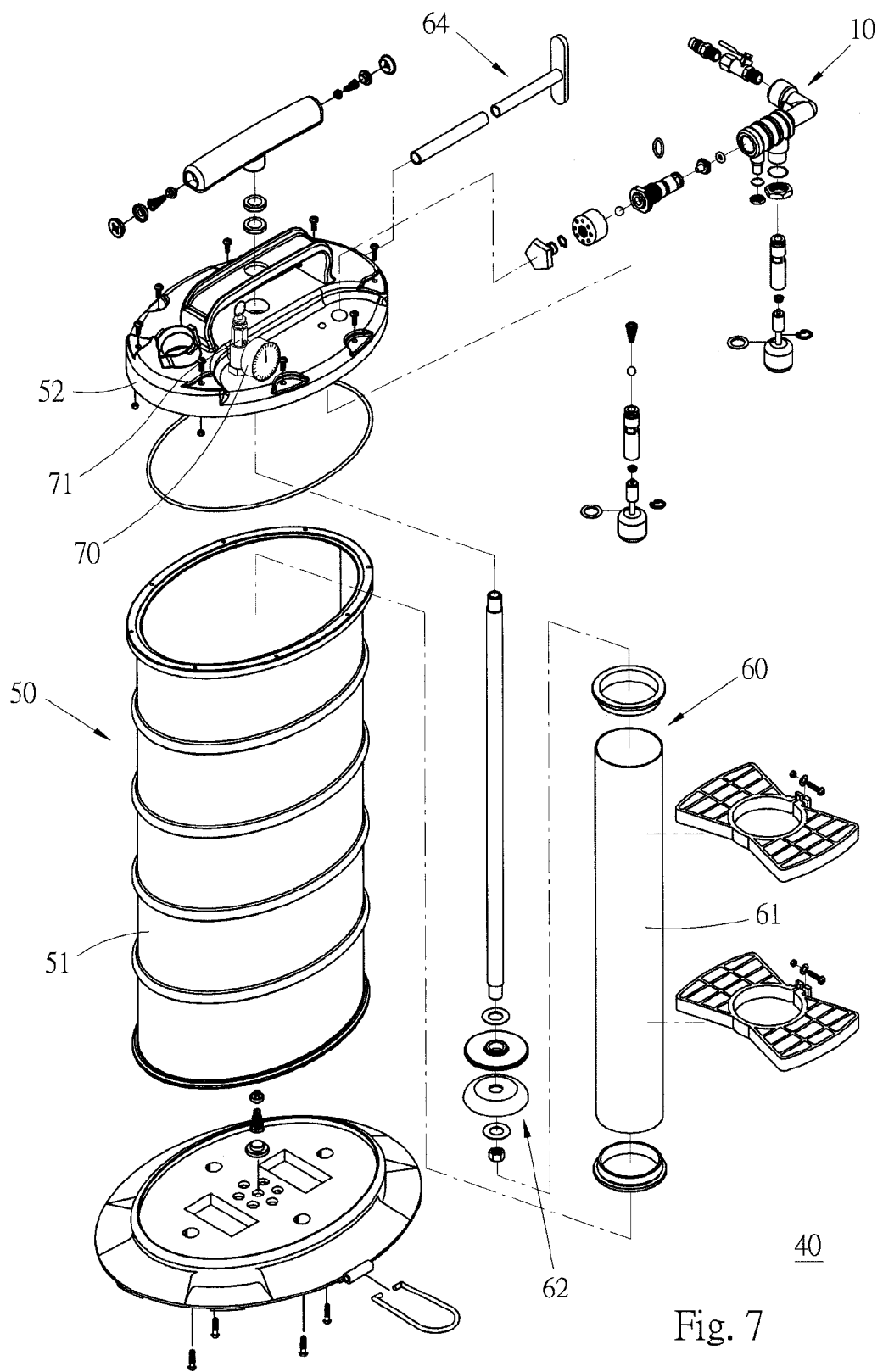
FIG. 7 is a perspective exploded view of a preferred embodiment of the manual/pneumatic pump of the present invention.
Figure 8:
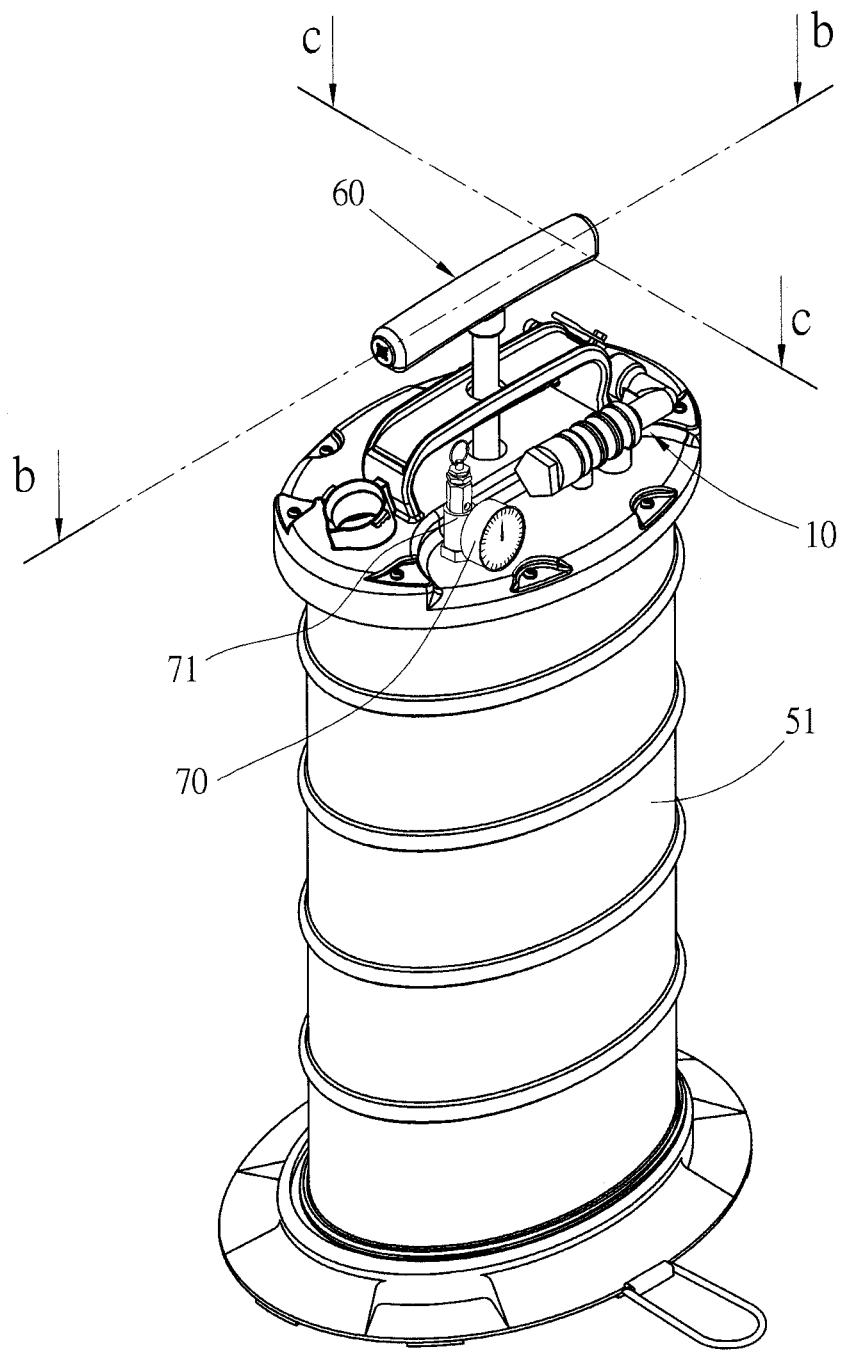
FIG. 8 is a perspective assembled view of the preferred embodiment of the manual/pneumatic pump of the present invention.
Figure 9:
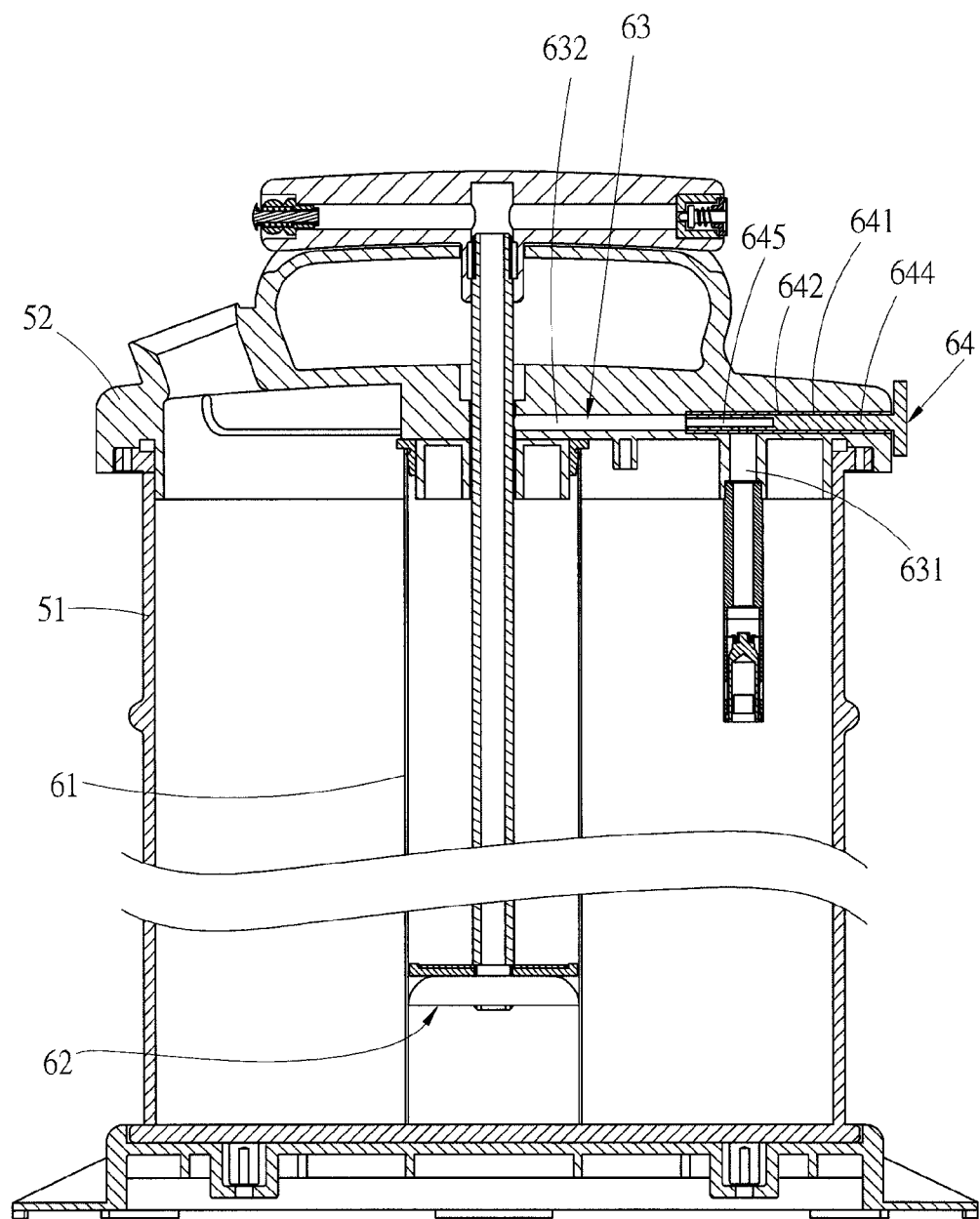
FIG. 9 is a sectional view taken along line b-b of FIG. 8, showing that the blocking section is positioned in an unblocking position.
Figure 10:
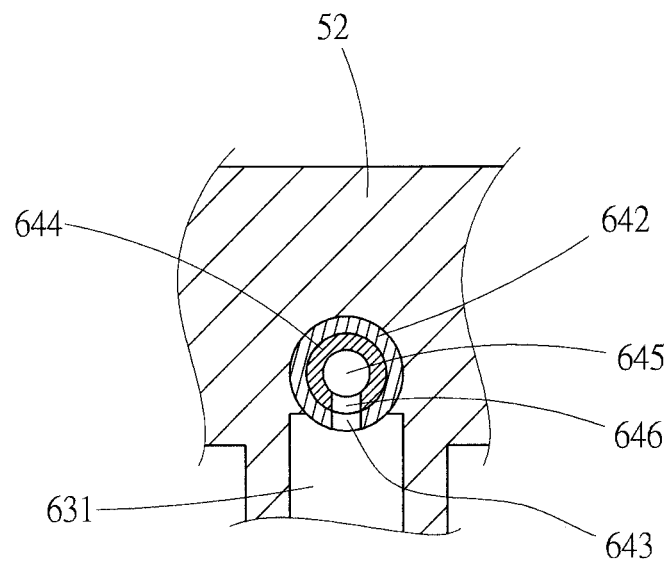
FIG. 10 is a sectional view taken along line c-c of FIG. 8, showing that the blocking section is positioned in an unblocking position.
Figure 12:
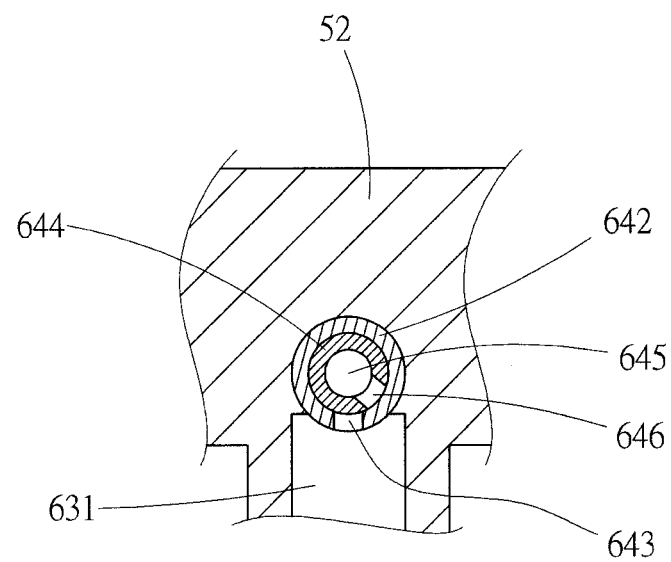
FIG. 12 is a sectional view taken along line c-c of FIG. 8, showing that the blocking section is positioned in a blocking position.
Figure 11:
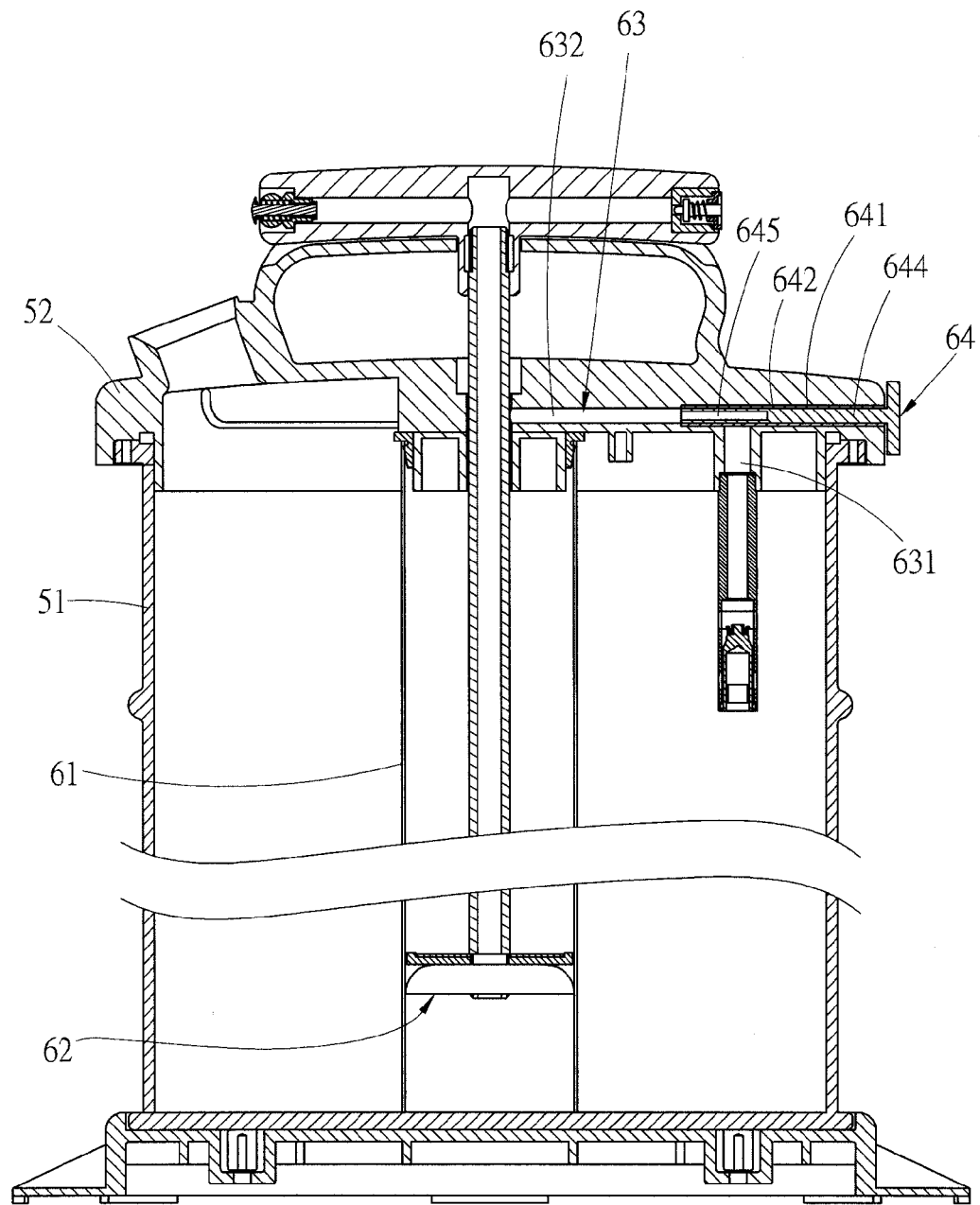
FIG. 11 is a sectional view taken along line b-b of FIG. 8, showing that the blocking section is positioned in a blocking position.

Please further refer to FIGS. 7 to 12. The Venturi tube assembly 10 is applied to the manual/pneumatic pump 40 as a component thereof. In other words, in addition to the Venturi tube assembly 10, the manual/pneumatic pump 40 further includes a collection barrel 50 and a manual pumping member 60.

The collection barrel 50 has a barrel body 51 with a top open end and a top cover 52 disposed at the top open end of the barrel body 51 to block the same and close the interior space of the barrel body 51. The Venturi tube assembly 10 is fixedly disposed on the top cover 52 with the sucking passage 25 in communication with the internal closed space of the barrel body 51.

The manual pumping member 60 has a hollow pumping tube 61 vertically disposed in the barrel body 51. Two ends of the pumping tube 61 are respectively blocked by the top cover 52 and the bottom of the barrel body 51. A piston set 62 is slidably disposed in the pumping tube 61. The piston set 62 is reciprocally movable within the pumping tube 61 to perform pumping operation. A manual sucking passage 63 is disposed in the top cover 52. Two ends of the manual sucking passage 63 respectively communicate with the interior space of the barrel body 51 and the interior space of the pumping tube 61. When the piston set 62 operates, the gas in the interior of the barrel body 51 is sucked out and exhausted to the atmosphere, whereby the pressure in the barrel body 51 is lowered.

The manual sucking passage 63 is sequentially divided into a manual sucking hole 631 in communication with the interior space of the barrel body 51 and an extension hole 632 extending in the top cover 52. One end of the extension hole 632 communicates with the manual sucking hole 631, while the other end of the extension hole 632 communicates with the interior space of the pumping tube 61.

The structure of the manual/pneumatic pump 40 pertains to prior art and thus will be only substantially described hereinafter.

To speak more specifically, in adaptation to the mode in which the Venturi tube assembly 10 is used to increase air pressure of a specific closed space at partial amount, the manual pumping member 60 further includes a blocking section 64. The blocking section 64 is movable between an unblocking position and a blocking position. When positioned in the unblocking position, the manual sucking passage 63 is freed to communicate with the interior space of the pumping tube 61 and the interior space of the barrel body 51. However, when positioned in the blocking position, the manual sucking passage 63 is blocked to discommunicate the interior space of the pumping tube 61 from the interior space of the barrel body 51.

The blocking section 64 has a pivot hole 641 coaxial with the extension hole 632. The pivot hole 641 outward extends from one end of the extension hole 632 through the top cover 52 to one side thereof. A sleeve 642 is coaxially fixedly fitted in the pivot hole 641. One end of the sleeve 642 passes over the top end of the manual sucking hole 631. A through hole 643 is radially formed through a wall of the sleeve 642 in communication with the manual sucking hole 631, whereby the manual sucking hole 631 communicates with the interior space of the sleeve 642. A pivot pin 644 is coaxially rotatably disposed in the sleeve 642. The circumference of one end of the pivot pin 644 blocks an inner side of the through hole 643.

The pivot pin 644 is rotatable around its axis between the blocking position and the unblocking position. A blind hole 645 inward axially extends from an end face of the end of the pivot pin 644 by a certain depth. The blind hole 645 has an open end in communication with the extension hole 632. A connection hole 646 is radially formed through a wall of the blind hole 645.

According to the above arrangement, when the pivot pin 644 is positioned in the unblocking position, the connection hole 646 communicates with the through hole 643, whereby the interior space of the barrel body 51 communicates with the extension hole 632 via the through hole 646, the connection hole 646 and the blind hole 645. Under such circumstance, the manual pumping member 60 can be manually operated to suck the gas out of the interior space of the barrel body 51 so as to lower air pressure therein. The value of the air pressure can be shown by a pressure meter 70 in communication with the interior space of the barrel body 51.

When the pivot pin 644 is positioned in the blocking position, the connection hole 646 is misaligned and spaced from the through hole 643 by a certain angular interval. Under such circumstance, the circumference of the pivot pin 644 blocks the through hole 643 to discommunicate the interior space of the barrel body 51 from the extension hole 632. In this case, when the Venturi tube assembly 10 is used in a mode for increasing air pressure of the interior space of the barrel body 51 at partial amount, the gas entering the space is prevented from improperly escaping to the extension hole 632 so as not to reduce pressure increasing effect. Also, the value of the pressure in the barrel body 51 can be shown by the pressure meter 70. In case of excessively great pressure, part of the gas can be exhausted from the interior of the barrel body 51 via a safety valve 71 in communication therewith so as to provide protection effect and ensure safety.

The above embodiments are only used to illustrate the present invention, not intended to limit the scope thereof. Many modifications of the above embodiments can be made without departing from the spirit of the present invention.

What is claimed is:
1. A Venturi tube assembly comprising:
a Venturi tube having a body section, an inlet end being positioned on one side of the body section, while an outlet end being positioned on the other side of the body section, an internal flow passage being formed in the body section between the inlet end and the outlet end, a pneumatic sucking passage outward extending from a low static pressure section of the internal flow passage to an outer circumference of the body section; and
a blocking member having an exhaustion space for communicating the outlet end with the atmosphere and a blocking body movable between an unblocking position and a blocking position, when positioned in the unblocking position, the outlet end communicating with the atmosphere via the exhaustion space, when positioned in the blocking position, the outlet end being blocked out of communication with the atmosphere, said Venturi tube assembly being characterized in that the blocking member further includes a micro-section movable between a full open position and a micro-position, when positioned in the full open position, the exhaustion space fully communicating the outlet end with the atmosphere, whereby a full amount of airflow is exhausted from the outlet end to the atmosphere, when positioned in the micro-position, a micro-amount of airflow smaller than the full amount being exhausted from the outlet end to the atmosphere;

wherein the blocking member further has a movement space for receiving the blocking body, whereby the blocking body is movable within the movement space between the unblocking position and the blocking position;

wherein the blocking member further has an end section directed to the outlet end, the movement space being formed between the outlet end and the end section and in communication with the exhaustion space;

wherein the end section has a connection collar, one end of the connection collar being fixedly connected to an outer circumference of the outlet end, an interior space of the connection collar communicating with the outlet end, the end section further having an end board connected to the other end of the connection collar to block the other end of the connection collar, the end board being spaced from the outlet end by a predetermined gap for blocking the interior space of the connection collar to form the exhaustion space.

2. The Venturi tube assembly as claimed in claim 1, wherein the end section further has multiple exhaustion ports formed through the end board for communicating the exhaustion space with the atmosphere.

3. The Venturi tube assembly as claimed in claim 1, wherein the micro-section has a shaft body shafted in the end board, one end of the shaft body extending into the interior of the connection collar and being directed to the outlet end, a cavity axially extending from an end face of the one end of the shaft body, whereby the movement space is formed between the cavity and the outlet end for receiving the blocking body.

4. The Venturi tube assembly as claimed in claim 3, wherein the cavity has the form of a hole and axially extends through the shaft body to the other end of the shaft body.

5. The Venturi tube assembly as claimed in claim 4, wherein from the one end of the shaft body to the other end of the shaft body, the cavity is axially sequentially divided into a large-diameter section, an annular shoulder face and a small-diameter section.

6. The Venturi tube assembly as claimed in claim 5, wherein the blocking body is a ball body with a diameter between the diameter of the large-diameter section and the diameter of the small-diameter section.

7. The Venturi tube assembly as claimed in claim 3, wherein the shaft body is axially movable between the full open position and the micro-position.

8. The Venturi tube assembly as claimed in claim 7, wherein the micro-section further has a micro-hole radially formed through a circumferential wall of the cavity in communication with the cavity, when the shaft body is positioned in the full open position, the end face of the one end of the shaft body being spaced from an end face of the outlet end, when the shaft body is positioned in the micro-position, the end face of the one end of the shaft body abutting against the end face of the outlet end with the micro-hole in communication with the exhaustion space, whereby the outlet end communicates with the exhaustion space via the micro-hole.

9. The Venturi tube assembly as claimed in claim 7, wherein the shaft body is screwed in the end board.

10. The Venturi tube assembly as claimed in claim 8, wherein the shaft body is screwed in the end board.

11. A manual/pneumatic pump comprising:
a Venturi tube assembly comprising:
a Venturi tube having a body section, an inlet end being positioned on one side of the body section, while an outlet end being positioned on the other side of the body section, an internal flow passage being formed in the body section between the inlet end and the outlet end, a pneumatic sucking passage outward extending from a low static pressure section of the internal flow passage to an outer circumference of the body section; and a blocking member having an exhaustion space for communicating the outlet end with the atmosphere and a blocking body movable between an unblocking position and a blocking position, when positioned in the unblocking position, the outlet end communicating with the atmosphere via the exhaustion space, when positioned in the blocking position, the outlet end being blocked out of communication with the atmosphere, said Venturi tube assembly being characterized in that the blocking member further includes a micro-section movable between a full open position and a micro-position, when positioned in the full open position, the exhaustion space fully communicating the outlet end with the atmosphere, whereby a full amount of airflow is exhausted from the outlet end to the atmosphere, when positioned in the micro-position, a micro-amount of airflow smaller than the full amount being exhausted from the outlet end to the atmosphere;

a collection barrel having a hollow barrel body with a top open end and a top cover disposed at the top open end of the barrel body to block the top open end, an interior space of the barrel body communicating with the pneumatic sucking passage of the Venturi tube assembly; and a manual pumping member having a pumping tube, two ends of the pumping tube being closed, a piston set being slidably disposed in the pumping tube, a manual sucking passage communicating with the interior space of the barrel body and the interior space of the pumping tube, whereby gas in the interior of the barrel body can be sucked into the pumping tube via the manual sucking passage and exhausted to the atmosphere by means of operating the piston set, the manual pumping member further including a blocking section movable between an unblocking position and a blocking position, when positioned in the unblocking position, the manual sucking passage being freed to communicate with the interior space of the pumping tube and the interior space of the barrel body, when positioned in the blocking position, the manual sucking passage being blocked to discommunicate the interior space of the pumping tube from the interior space of the barrel body.

12. The manual/pneumatic pump as claimed in claim 11, wherein the manual sucking passage has the form of a hole, at least a part of one end of the blocking section extending into the manual sucking passage, the blocking section being rotatable around an axis of the part between the unblocking position and the blocking position.

13. The manual/pneumatic pump as claimed in claim 12, wherein the manual sucking passage is disposed in the top cover and is sequentially divided into a manual sucking hole and an extension hole, one end of the manual sucking hole communicating with the interior space of the barrel body, the extension hole extending from the other end of the manual sucking hole and communicating with the pumping tube.

14. The manual/pneumatic pump as claimed in claim 13, wherein the blocking section has a pivot hole coaxially communicating with one end of the extension hole, the blocking section further having a sleeve coaxially fixedly fitted in the pivot hole, one end of the sleeve extending into the extension hole and being positioned between the extension hole and the manual sucking hole, a through hole being formed through the sleeve in communication with the manual sucking hole and the interior of the sleeve, the blocking section further having a pivot pin coaxially rotatably disposed in the sleeve, the pivot pin being rotatable between the blocking position and the unblocking position, an outer circumference of the pivot pin airtight attaching to an inner circumference of the sleeve, one end of the pivot pin blocking the through hole, a blind hole axially extending from an end face of one end of the pivot pin by a predetermined depth, the blind hole having an open end in communication with the extension hole, a connection hole being formed through a wall of the blind hole, when the pivot pin is positioned in the unblocking position, the connection hole communicating with the through hole, when the pivot pin is positioned in the blocking position, the connection hole being misaligned and spaced from the through hole by a predetermined angular interval to discommunicate the interior space of the barrel body from the extension hole.

\* \* \* \* \*